United States Patent
Numata

(10) Patent No.: US 7,543,619 B2
(45) Date of Patent: Jun. 9, 2009

(54) HEAVY DUTY TIRE

(75) Inventor: Kazuki Numata, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 166 days.

(21) Appl. No.: 11/517,463

(22) Filed: Sep. 8, 2006

(65) Prior Publication Data

US 2007/0151649 A1 Jul. 5, 2007

(30) Foreign Application Priority Data

Dec. 29, 2005 (JP) .............................. 2005-380669

(51) Int. Cl.
*B60C 13/00* (2006.01)
*B60C 13/04* (2006.01)
*B60C 15/00* (2006.01)

(52) U.S. Cl. .................. 152/525; 152/524; 152/539; 152/541

(58) Field of Classification Search .............. 152/523, 152/524, 525
See application file for complete search history.

(56) References Cited

U.S. PATENT DOCUMENTS 3,406,733 A * 10/1968 Boileau ................. 152/542
4,044,811 A * 8/1977 Dudek et al. ................ 152/452

FOREIGN PATENT DOCUMENTS

| JP | 06016017 | * | 1/1994 |
| JP | 06328912 | * | 11/1994 |
| JP | 2002-127718 A | | 5/2002 |

\* cited by examiner

*Primary Examiner*—Justin Fischer
(74) *Attorney, Agent, or Firm*—Birch, Stewart, Kolasch & Birch, LLP

(57) ABSTRACT

A heavy duty tire with decreased rolling resistance without impairing durability, comprising carcass 6, belt layer 7 disposed radially outward of the carcass in tread portion 2, and sidewall rubber 3g disposed axially outward of the carcass in sidewall portion 3 and extending in the radial direction of the tire, wherein the sidewall rubber includes an axially inner rubber portion 10 disposed axially outward of the carcass and an axially outer rubber portion 11 disposed axially outward of the inner rubber portion to form the tire outer surface, the inner rubber portion 10 has a lower loss tangent "tan δ" than the outer rubber portion 11 by a difference of 0.010 to 0.035, and the inner rubber portion 10 has a lower complex elastic modulus than the outer rubber portion 11 by a difference of 0.5 to 1.4 MPa.

7 Claims, 2 Drawing Sheets

HEAVY DUTY TIRE

BACKGROUND OF THE INVENTION

The present invention relates to a heavy duty tire, more particularly to a heavy duty tire having sidewalls improved to reduce the tire rolling resistance without impairing the durability.

In recent years, vehicle fuel cost reduction has been strongly demanded in connection with global environment problem, so various attempts for reducing the rolling resistance of tires have been made. Reduction of the rolling resistance is particularly effective for heavy duty tires used for vehicles such as trucks and buses, since the fuel consumption thereof is large.

For reducing the rolling resistance of heavy duty tires, it has been conventionally attempted, for example, to use a rubber material is having a low energy loss in a tread of the tires, or to decrease a strain generated when the tires are deformed under loading. However, the former method has a fear that the steering stability and the wear resistance are deteriorated. In case of the latter method, ride comfort is apt to lower. Like this, conventional methods still stand improvement.

On the other hand, JP-A-2002-127718 discloses a pneumatic tire capable of preventing crack generation in a sidewall portion wherein a sidewall rubber composed of an axially inner rubber layer and an axially outer rubber layer is disposed in the sidewall portion. However, there is no teaching about reduction of rolling resistance.

It is an object of the present invention to provide a heavy duty tire capable of reducing the rolling resistance without impairing the durability of the sidewall portion.

This and other objects of the present invention will become apparent from the description hereinafter.

SUMMARY OF THE INVENTION

It has now been found that when a sidewall rubber to be disposed in the sidewall portion of a tire is formed into a two layer structure including an axially inner rubber portion having an adequate flexibility, energy loss in the sidewall portion can be decreased to decrease the rolling resistance without lowering the durability such as cut resistance.

In accordance with the present invention, there is provided a heavy duty tire comprising a carcass having a carcass cord which extends from a tread portion to each of bead cores in a pair of bead portions through a pair of sidewall portions, a belt layer disposed inside the tread portion and radially outward of the carcass, and a sidewall rubber disposed axially outward of the carcass in the sidewall portion and extending in the radial direction of the tire, wherein the sidewall rubber includes an axially inner rubber portion disposed axially outward of the carcass and an axially outer rubber portion disposed axially outward of the inner rubber portion to form the tire outer surface, the inner rubber portion has a lower loss tangent (tan δ) than the outer rubber portion and the difference in loss tangent between them is from 0.010 to 0.035, and the inner rubber portion has a lower complex elastic modulus than the outer rubber portion and the difference in complex elastic modulus between them is from 0.5 to 1.4 MPa.

In a preferable embodiment, the tire has the maximum width at a location M which is the middle of a radial distance X between the radially outer surface of a bead core and the radially inner surface of the widest belt ply of a belt layer composed of a plurality of belt plies.

Preferably, the inner rubber portion of the sidewall rubber has a thickness of 0.3 to 0.5 time a thickness between the carcass cord and the tire outer surface at the middle location M. The radially outer end of the inner rubber portion of the sidewall rubber is located in a region between the axially outer end of a belt layer or a widest belt ply and a location radially outwardly apart from the middle location M by a distance of 0.25 time the radial distance X. The radially inner end of the inner rubber portion of the sidewall rubber is located radially below a location which is radially inwardly apart from the middle location M by a distance of 0.25 time the radial distance X, and is located radially above the radially outermost end of a reinforcing cord layer which is preferably disposed around the bead core. Preferably, a bead apex rubber is disposed radially outward of the bead core and radially inward of the inner rubber portion of the sidewall rubber.

In the heavy duty tires according to the present invention, the sidewall rubber to be disposed in the sidewall portion of a tire includes an axially inner rubber portion which is disposed axially outward of the carcass, and an axially outer rubber portion which is disposed axially outward of the inner rubber portion and forms the tire outer surface, wherein the axially inner rubber portion has a loss tangent (tan δ) and a complex elastic modulus which are lower than those of the axially outer rubber portion of the sidewall rubber and, moreover, the differences thereof are maintained within specific ranges. Since a rubber having a low loss tangent and a low complex elastic modulus is used in an axially inner part of the sidewall portion which is greatly bent at the time of running, the energy loss which occurs in the sidewall portion is decreased, thus decreasing the rolling resistance. Further, since a rubber having a higher loss tangent and a higher complex elastic modulus is used in an axially outer part of the sidewall portion, the durability of the sidewall portion can be prevented from being deteriorated.

DETAILED DESCRIPTION OF THE INVENTION

Figure 1:
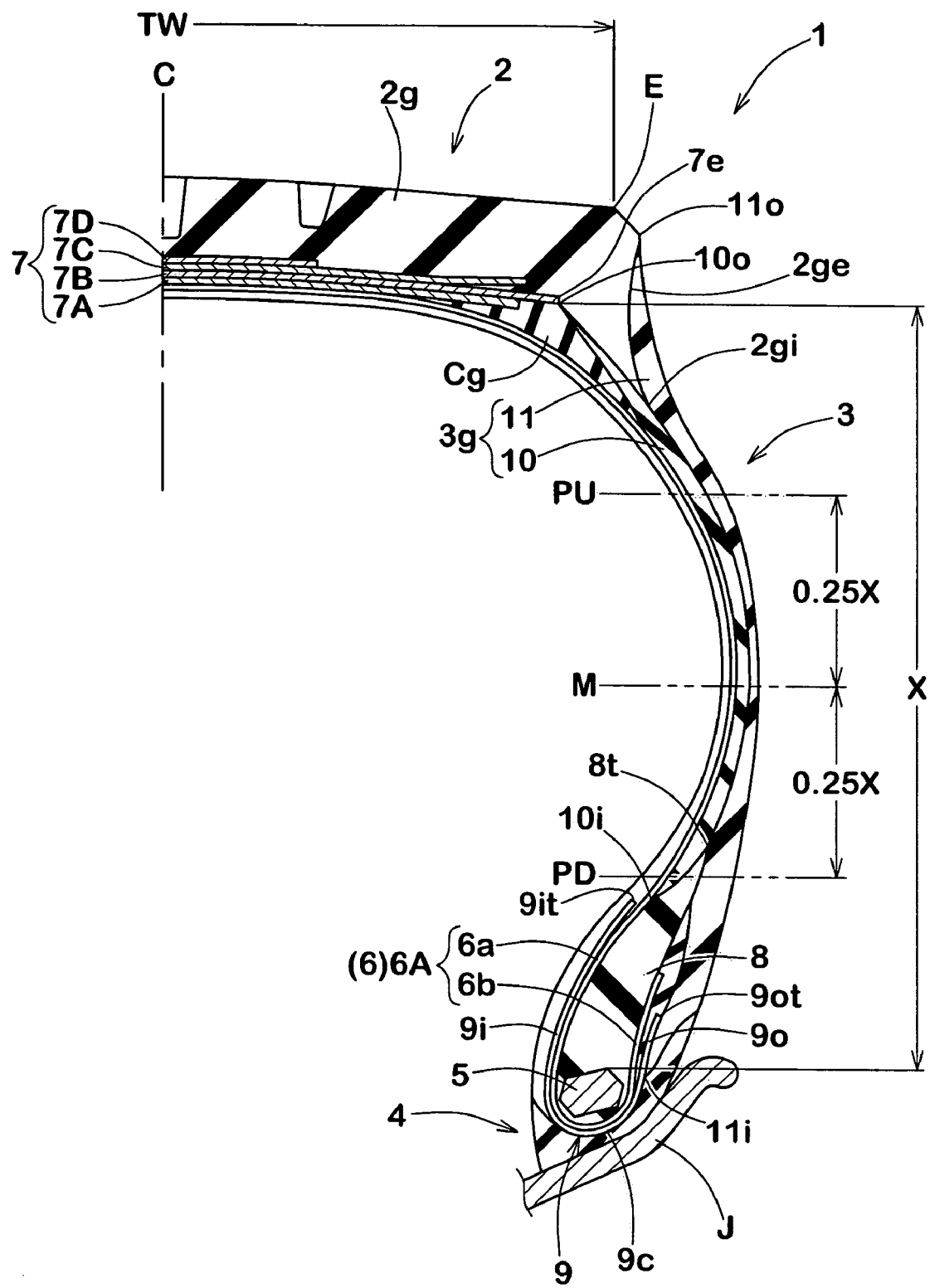
FIG. 1 is a cross sectional view of a heavy duty tire according to an embodiment of the present invention.
Figure 2:
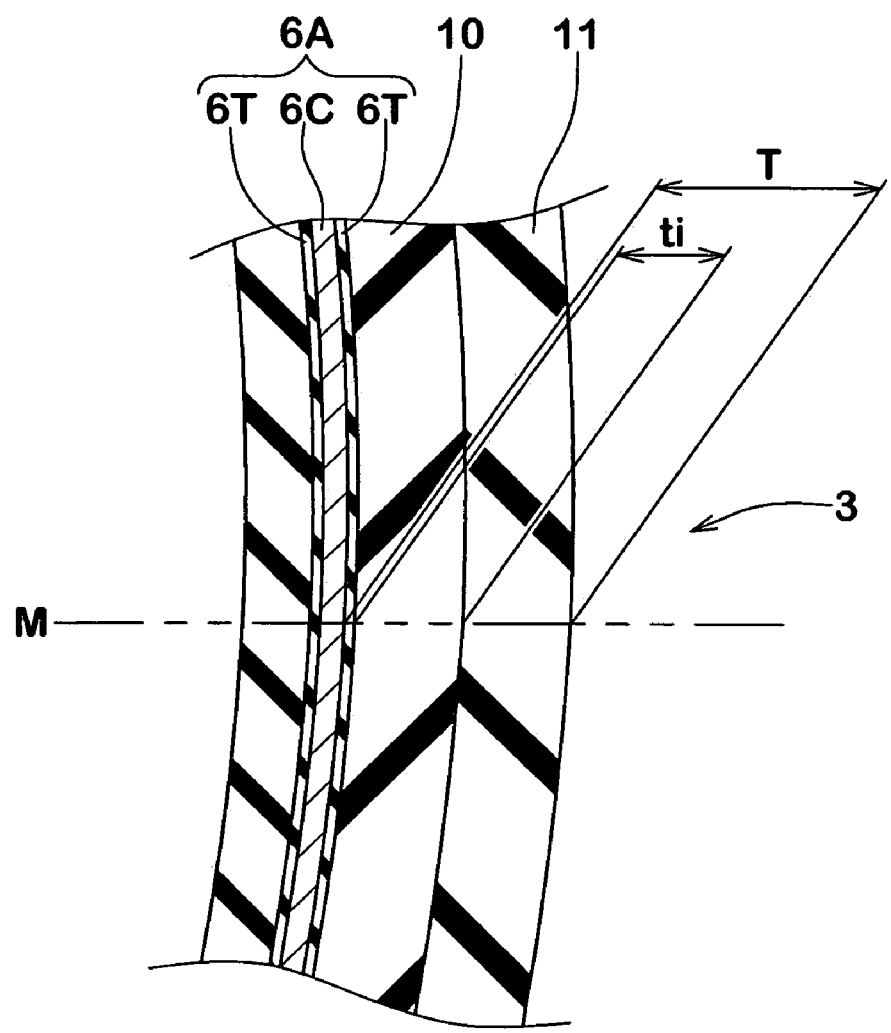
FIG. 2 is an enlarged cross sectional view of a main part of the tire shown in FIG. 1.

An embodiment of the present invention will now be explained with reference to the accompanying drawings, wherein FIG. 1 is a cross sectional view of a right half of a heavy duty tire 1 in a normal state according to the present invention; and FIG. 2 is an enlarged cross sectional view of a main part of the tire shown in FIG. 1.

The term "normal state" denotes a normally-inflated unloaded state of the tire in which the tire is mounted on a standard rim J and inflated to a normal inner pressure, but is not loaded. In the specification, the "dimensions" of respective parts or portions of the tire denote those measured in the normal state, unless otherwise noted.

The term "standard rim" denotes a rim defined for every tire in a standardizing system on which the tire is based and is, for example, "standard rim" in JATMA, "design rim" in TRA and "measuring rim" in ETRTO. The term "normal inner pressure" denotes an air pressure defined for every tire in the standardizing system and is, for example, "maximum air pressure" in JATMA, the maximum value recited in the table of "Tire Load Limits at Various Cold Inflation Pressure" in TRA, and "inflation pressure" in ETRTO".

Further, the "loss tangent" and "complex elastic modulus" as used herein denote values measured with respect to rectangular samples having a size of 4 mm in width, 30 mm in length and 1.5 mm in thickness by a viscoelasticity spectrometer made by Kabushiki Kaisha Iwamoto Seisakusho under the conditions of measuring temperature 70° C., frequency 10 Hz, initial strain 10% and dynamic strain ±2%.

Heavy duty tire 1 includes a toroidal carcass 6 that extends from a tread portion 2 to each of bead cores 5 in opposing bead portions 4 through sidewall portions 3, and a belt layer 7 that is disposed radially outward of the carcass 6 in the tread portion 2.

The carcass 6 comprises at least one carcass ply 6A (in this embodiment, one carcass ply) in which carcass cords made of steel are disposed at an angle of 80 to 90° with respect to the tire equator C. The carcass ply 6A is formed, as shown in FIG. 2, by covering the both sides of carcass cord or cords 6C with a topping rubber 6T. The carcass ply 6A is composed of a toroidal main portion 6a that extends from one bead core 5 to the opposing bead core 5, passing through the crown region of the tire, and turnup portions 6b that are continuous with the both ends of the main portion 6a and are turned up around the bead cores 5 from the axially inside to the axially outside of the tire to thereby anchor the carcass ply.

Between the main portion 6a and each turnup portion 6b is disposed a bead apex rubber 8 that extends radially outwardly from the bead core 5 in a tapered manner.

The belt layer 7 comprises at least three plies of belt cords made of steel. The tire 1 according to the embodiment shown in FIG. 1 includes a belt layer 7 composed of four belt plies wherein disposed on the radially innermost side is a first belt ply 7A of belt cords arranged at an angle of, for instance, 60±15° with respect to the tire equator C, and subsequently disposed radially outward of the first ply are second to fourth belt plies 7B, 7C and 7D of belt cords arranged at a small angle of, for instance, 10 to 35° with respect to the tire equator C. The 2nd to 4th belt plies 7B, 7C and 7D are stacked so that the belt cords in one ply crosses the cords in the other belt ply. Among belt plies 7A to 7D, the second belt ply 7B has the maximum width. For example, the width of the second belt ply 7B is from 0.80 to 0.95 time the tread width TW, and the width of the first and third belt plies 7A and 7C is from 85 to 95% of the maximum width of the belt ply, namely the width of the second belt ply 7B.

Cushion rubbers Cg having an approximately triangular cross section are disposed between the both end portions of the belt layer 7 and the carcass 6 in order to make up for a difference in curvature between the belt layer 7 and the main portion 6a of the carcass ply 6A. Each cushion rubber Cg disposed radially inward of each end portion of the belt layer extends therefrom along the carcass ply 6A in a tapered manner so as to terminate at a location radially above a location PU which is radially outwardly spaced from the middle location M by a distance of 0.25 time the radial distance X.

A reinforcing cord layer 9 having a steel cord is disposed in the bead portion 4 to envelop the bead core 5 through the carcass ply 6A. The reinforcing cord layer 9 has an approximately U-shaped cross section. The reinforcing cord layer 9 includes a curved intermediate portion 9c that passes radially inward of the turnup portion 6b of the carcass ply 6, an axially inner portion 9i that is located axially inward of the curved portion 9c and radially outwardly extends along the axially inner surface of the main portion 6a of the carcass ply 6A, and an axially outer portion 9o that is located axially outward of the curved portion 9c and radially outwardly extends along the axially outer surface of the carcass turnup portion 6b.

Such a reinforcing cord layer 9 reduces distortion which acts on the terminal end of the carcass turnup portion 6b in running under loading, thus enhancing the durability of the bead portion 4, for example, if terminal end 9it of the axially inner portion 9i is located radially above the terminal end of the carcass turnup portion 6b and terminal end 9ot of the axially outer portion 9o is located radially below the terminal end of the carcass turnup portion 6b. The terminal end 9ot is located radially above the level of the radially outer surface of the bead core 5.

In the sidewall portion 3 of the tire 1 is disposed a sidewall rubber 3g which passes axially outward of the carcass 6 in the radial direction of the tire. The sidewall rubber 3g has a two layer structure comprising an axially inner rubber portion 10 disposed axially outward of the carcass 6 and an axially outer rubber portion 11 disposed axially outward of the inner rubber portion 10 to form the tire outer surface. In the heavy duty tire 1 of the present invention, the inner rubber portion 10 has a lower loss tangent (tan δ) than the outer rubber portion 11, and the difference in loss tangent between them is from 0.010 to 0.035. Further, the inner rubber portion 10 has a lower complex elastic modulus than the outer rubber portion 11, and the difference in complex elastic modulus between them is from 0.5 to 1.4 MPa.

A large flexural strain generates repeatedly in the sidewall portion 3 during loaded running of tire. The rolling resistance can be decreased by using a rubber compound which has a low loss tangent and is hard to generate heat, in the sidewall rubber 3g. Separation of a sidewall rubber from carcass cords can be prevented by using a flexible, easily deformable rubber in the sidewall rubber 3g so as to follow a large flexural strain. On the other hand, the sidewall rubber 3g requires an adequate rigidity and a cut resistance sufficient for protecting the carcass 6 from contact with a foreign matter.

In the present invention, for these purposes, the sidewall rubber 3g is divided into two portions 10 and 11, and a rubber compound having a small loss tangent (low tan δ) and a small complex elastic modulus is used in the inner rubber portion 10 located on the carcass 6 side, thereby decreasing heat generation and energy loss which occur in this portion. Thus, the rolling resistance caused by flexural strain of the sidewall portion 3 can be decreased. Further, since the inner rubber portion 10 has a complex elastic modulus enabling to deform following deformation of the carcass cord 6C, separation of the sidewall rubber from the carcass cord can be suppressed, thus enhancing the durability of the sidewall portion. Further, since a rubber compound having a large loss tangent (tan δ) and a large complex elastic modulus is used in the outer rubber portion 11 of the sidewall rubber 3g, the durability, particularly cut resistance, can be retained. Therefore, according to the present invention, the rolling resistance of heavy duty tires can be decreased without impairing the durability of the sidewall portion 3.

The loss tangent value (tan δ) of the inner rubber portion 10 is not particularly limited so long as it is sufficiently lower than that of the outer rubber portion 11. From the viewpoint of sufficiently decreasing heat generation and energy loss, it is preferable that the loss tangent (tan δ) of the inner rubber portion 10 of the sidewall rubber 3g is at most 0.075, especially at most 0.060, more especially at most 0.050. On the other hand, if the loss tangent of the inner rubber portion 10 is too small, the sidewall portion tends to be inferior in resistance to impact from outside. Therefore, it is preferable that the loss tangent (tan δ) of the inner rubber portion 10 is at least 0.030, especially at least 0.040.

The loss tangent (tan δ) of the inner rubber portion 10 is lower than that of the outer rubber portion 11 by 0.010 to 0.035. If the difference in loss tangent between the inner rubber portion 10 and the outer rubber portion 11 is less than 0.010, the loss tangent of the both portions come close and, therefore, there is a fear that the cut resistance of the outer rubber portion 11 is deteriorated or the rolling resistance-decreasing effect of the inner rubber portion 10 is lowered. If the difference is more than 0.035, a strain is apt to concentrate at the interface between the inner and outer rubber portions 10 and 11, so there is a fear of deterioration of the durability of the sidewall rubber 3g such as separation between the inner and outer rubber portions 10 and 11. From such points of view, the difference in loss tangent (tan δ) between the inner and outer rubber portions 10 and 11 is preferably at least 0.015, more preferably at least 0.020, and is preferably at most 0.030, more preferably at most 0.025.

The complex elastic modulus of the inner rubber portion 10 of the sidewall rubber 3g is not particularly limited so long as it is sufficiently lower than that of the outer rubber portion 11. However, if the complex elastic modulus of the inner rubber portion 10 is too large, the inner rubber portion cannot easily deform following bending deformation of sidewall portion 3 of the tire at the time of loaded running, so damages such as separation from carcass cord are easy to occur. Also, there is a fear that the impact-absorbing performance is lowered to deteriorate the ride comfort. From such points of view, the complex elastic modulus of the inner rubber portion 10 is preferably at most 3.5 MPa, more preferably at most 3.0 MPa. On the other hand, if the complex elastic modulus of the inner rubber portion 10 is too small, there is a fear that the rigidity of the sidewall portion 3 is markedly lowered to deteriorate the steering stability. Therefore, it is preferably at least 2.0 MPa, more preferably at least 2.5 MPa.

The complex elastic modulus of the inner rubber portion 10 is lower than that of the outer rubber portion 11 by 0.5 to 1.4 MPa. If the difference in complex elastic modulus between the inner rubber portion 10 and the outer rubber portion 11 is less than 0.5 MPa, the complex elastic modulus of the both portions come close and, therefore, there is a fear that the cut resistance of the outer rubber portion 11 is deteriorated or the inner rubber portion 10 will not follow the deformation of the sidewall portion, thus resulting in occurrence of separation from carcass cord. If the difference is more than 1.4 MPa, a strain is apt to concentrate at the interface between the inner and outer rubber portions 10 and 11, so there is a fear of deterioration of the durability of the sidewall rubber 3g. From such points of view, the difference in complex elastic modulus between the inner and outer rubber portions 10 and 11 is preferably at least 0.7 MPa, more preferably at least 1.0 MPa, and is preferably at most 1.3 MPa, more preferably at most 1.2 MPa.

The thickness of the inner rubber portion 10 is not particularly limited. However, if the thickness is too small, there is a fear that the rolling resistance-decreasing effect is not sufficiently obtained, and if it is too large, the thickness of the outer rubber portion 11 is relatively decreased, so the cut resistance of the sidewall portion 3 may be deteriorated. From such points of view, it is preferable that at a location M which is the middle of a radial distance X from a terminal end 7e of a belt layer 7 to the radially outer surface of a bead core 5, the thickness "ti" (shown in FIG. 2) of the inner rubber portion 10 of the sidewall rubber 3g is from 0.3 to 0.5 time a rubber, thickness T from a carcass cord 6C to the axially outer surface of tire 1 (thickness T including the thickness of a topping rubber layer 6T located on the axially outer side of the carcass cord 6C). The term "terminal end 7e" of the belt layer 7 denotes a radially inner position at an axially outermost end of the belt layer 7, i.e., at a terminal end of a widest belt ply of the belt layer 7.

In the embodiment shown in FIG. 1, the inner rubber portion 10 of the sidewall rubber 3g extends radially along the carcass 6 with substantially maintaining the thickness "ti" at the middle position M. The both end portions of the inner rubber portion 10 are tapered.

Preferably, the radially outer end 10o of the inner rubber portion 10 is located between the terminal end 7e of the belt layer 7 and a location PU which is radially outwardly apart from the middle position M by a distance of 0.25 time the radial distance X (i.e., 0.25X). The term "between" means a region including the both ends of the region and, therefore, the outer end 10o of the inner rubber portion 10 may be located at the location PU or at the terminal end 7e of the belt layer 7.

If the radially outer end 10o of the inner rubber portion 10 is located radially below the location PU, the rolling resistance cannot be sufficiently decreased in a buttress region ranging from the location PU to the terminal end 7e of the belt layer 7. Further, if the radially outer end 10o is located radially above the terminal end 7e of the belt layer, the steering stability is rather deteriorated. In the embodiment shown in FIG. 1, the tapered end portion extends along a cushion rubber Cg having an approximately triangular cross section to reach the terminal end 7e of the belt layer 7 so as to decrease the rolling resistance over a wide region.

Further, it is preferable that the radially inner end 10i of the inner rubber portion 10 is located between a location PD which is radially inwardly apart from the middle position M by a distance of 0.25 time the radial distance X (i.e., 0.25X) and the radially outermost end of a reinforcing cord layer 9, i.e., a terminal end located at radially higher position of axially inner and outer portions of the reinforcing cord layer 9 (in the embodiment shown in FIG. 1, terminal end 9it of axially inner portion 9i). The term "between" means a region including the both ends of the region and, therefore, the inner end 10i of the inner rubber portion 10 may be located at the location PD or at a location corresponding to the radially outermost end (terminal end 9it) of the reinforcing cord layer 9.

If the radially inner end 10i of the inner rubber portion 10 is located radially above the location PD, the rolling resistance cannot be sufficiently decreased in a region ranging from the location PD to the terminal end 9it of the reinforcing cord layer 9. Further, even if the radially inner end 10i is located radially below the terminal end 9it of the reinforcing cord layer 9, no further decrease of rolling resistance is obtained. In the embodiment shown in FIG. 1, a tapered end portion of the inner rubber portion 10 extends radially inwardly along the carcass 6 to reach a location on substantially the same level as the terminal end 9it of the inner portion 9i of the reinforcing cord layer 9 so as to decrease the rolling resistance over a wide region on the bead portion side.

The both end portions of the inner rubber portion 10 of the sidewall rubber 3g extend in a tapered manner to gradually decrease their thickness toward their tips 10o and 10i, whereby a difference in rigidity from surrounding rubber portions is eased to avoid stress concentration at the tips 10o and 10i, thereby preventing occurrence of damages starting therefrom.

In a preferable embodiment, a radially outer end portion 8t of a bead apex rubber 8 extends in a tapered manner between the inner rubber portion 10 and the outer rubber portion 11 of the sidewall rubber 3g. Preferably, the inner rubber 10 of the sidewall rubber 3g has a smaller complex elastic modulus than the bead apex rubber 8. Thus, as a result of making the inner rubber portion 10 intervene between the main portion 6a of the carcass ply 6A and the bead apex rubber 8, the inner rubber portion 10 follows a large flexural deformation of carcass cord 6C at bead portion 4, thus effectively easing a strain which may generate there. Therefore, the durability of the bead portion 4 can be further enhanced by such a construction.

In the embodiment shown in FIG. 1, the outer rubber portion 11 of the sidewall rubber 3g has a radial length larger than the inner rubber portion 10, whereby the outer rubber portion 11 can fully cover the inner rubber portion 10 without exposing the inner rubber portion 10. Thus, the outer surface of the sidewall portion 3 is formed over its entire region by the outer rubber portion 11 which has a large cut resistance.

The radially outer end portion of the outer rubber portion 11 extend radially outwardly in a tapered manner toward its tip 11o to cover an axially outer side edge face 2ge of a tread rubber 2g, and terminates at a location just before ground contact edge E without reaching the edge E. Such an outer rubber portion 11 can exhibit a good cut resistance over a wide region reaching the tread portion 2. Also, since the outer rubber portion 11 does not contact a road, dragging wear can be prevented.

Each of axially outer end portions of the tread rubber 2g, which are located axially outward of the both ends of the widest belt ply, extends radially inwardly in a tapered manner toward its tip 2gi between the radially outer end portions of the inner and outer rubber portions 10 and 11 of the sidewall rubber 3g, and terminates in a region between the axially outer end 7e of the widest belt ply and the location PU. With such an arrangement, the tread rubber 2g is contiguous to the cushion rubber Cg through the inner rubber portion 10 of the sidewall rubber 3g. This arrangement is preferred from the viewpoint of good durability.

The outer rubber portion 11 of the sidewall rubber 3g extends radially inwardly along the inner rubber portion 10 and then along the axially outer surface of the bead apex rubber 8. A radially inner end portion of the outer rubber portion 11 extends radially inwardly in a tapered manner toward its tip 11i, and terminates at a level approximately the same as the radial level of the radially outer surface of the bead core 5. Therefore, the outer rubber portion 11 can enhance the cut resistance over a wide region of the sidewall portion 3, especially even on the bead portion side thereof.

While a preferable embodiment of the present invention has been described with reference to the drawings, it goes without saying that the present invention is not limited to only such an embodiment and various changes and modifications may be made. The present invention is more specifically described and explained by means of the following examples and comparative examples. It is to be understood that the present invention is not limited to these examples.

EXAMPLES 1 TO 13 AND COMPARATIVE EXAMPLES 1 TO 5

Heavy duty tires (size: 11R22.5 14PR) having a base structure shown in FIG. 1 were manufactured based on the specifications shown in Table 1, and the rolling resistance and durability thereof were tested by the methods described below. Specifications of tires which are not described in the table are common to all tires. The radial distance X of the tires from the axially outer end 7e of the belt layer 7 to the radially outer surface of the bead core 5 is 180 mm.

<Rolling Resistance>

A tire was run using a rolling resistance tester under conditions of rim 7.50×22.5, inner pressure 700 kPa, speed 80 km/h and tire load 24.52 kN, and the rolling resistance was measured. The results are shown as an index based on the result of Comparative Example 1 regarded as 100. The smaller the value, the better the rolling characteristics.

<Durability>

A cut having a length of 5 mm and a depth of 3 mm was formed in the sidewall portion at the middle position M, and the tire was run on a drum of a drum tester under conditions of rim 7.50×22.5, inner pressure 850 kPa, speed 50 km/h, tire load 39.8 kN and running time 450 hours. The degree of cut growth was visually observed. The results are shown as an index based on the result of Comparative Example 1 the length of grown cut of which was regarded as 100. The smaller the value, the better the durability.

Test results are shown in Table 1.

TABLE 1

|  | Com. Ex. 1 | Com. Ex. 2 | Com. Ex. 3 | Com. Ex. 4 | Com. Ex. 5 | Ex. 1 | Ex. 2 | Ex. 3 | Ex. 4 |
|---|---|---|---|---|---|---|---|---|---|
| Outer layer of sidewall rubber |  |  |  |  |  |  |  |  |  |
| Loss tangent tan δ | 0.085 | 0.085 | 0.085 | 0.085 | 0.085 | 0.085 | 0.085 | 0.085 | 0.085 |
| Complex elastic modulus (MPa) | 3.9 | 3.9 | 3.9 | 3.9 | 3.9 | 3.9 | 3.9 | 3.9 | 3.9 |
| Inner layer of sidewall rubber |  |  |  |  |  |  |  |  |  |
| Loss tangent tan δ | 0.085 | 0.077 | 0.048 | 0.075 | 0.075 | 0.050 | 0.075 | 0.060 | 0.075 |
| Complex elastic modulus (MPa) | 3.9 | 3.4 | 3.4 | 3.5 | 2.3 | 2.5 | 2.5 | 2.5 | 3.4 |
| Thickness ratio ti/T | — | 0.5 | 0.5 | 0.5 | 0.5 | 0.5 | 0.5 | 0.5 | 0.5 |
| Radial distance from middle position M to radially outer end (mm) | 90 | 90 | 90 | 90 | 90 | 90 | 90 | 90 | 90 |
| Radial distance from middle position M to radially inner end (mm) | 90 | 90 | 90 | 90 | 90 | 90 | 90 | 90 | 90 |
| Rolling resistance (index) | 100 | 98 | 96 | 98 | 97 | 96 | 97 | 96 | 97 |
| Durability (index) | 100 | 100 | 95 | 100 | 95 | 98 | 100 | 100 | 100 |
| Difference in loss tangent | — | 0.008 | 0.037 | 0.010 | 0.010 | 0.035 | 0.010 | 0.025 | 0.010 |
| Difference in complex elastic modulus (MPa) | — | 0.5 | 0.5 | 0.4 | 1.6 | 1.4 | 1.4 | 1.4 | 0.5 |

TABLE 1-continued

|  | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|
| Outer layer of sidewall rubber | | | | | | | | | |
| Loss tangent tan δ | 0.085 | 0.085 | 0.085 | 0.085 | 0.085 | 0.085 | 0.085 | 0.085 | 0.085 |
| Complex elastic modulus (MPa) | 3.9 | 3.9 | 3.9 | 3.9 | 3.9 | 3.9 | 3.9 | 3.9 | 3.9 |
| Inner layer of sidewall rubber | | | | | | | | | |
| Loss tangent tan δ | 0.075 | 0.050 | 0.050 | 0.050 | 0.050 | 0.050 | 0.050 | 0.050 | 0.050 |
| Complex elastic modulus (MPa) | 2.9 | 2.5 | 2.5 | 2.5 | 2.5 | 2.5 | 2.5 | 2.5 | 2.5 |
| Thickness ratio ti/T | 0.5 | 0.2 | 0.8 | 0.5 | 0.5 | 0.5 | 0.5 | 0.5 | 0.5 |
| Radial distance from middle position M to radially outer end (mm) | 90 | 90 | 90 | 50 | 40 | 30 | 90 | 90 | 90 |
| Radial distance from middle position M to radially inner end (mm) | 90 | 90 | 90 | 90 | 90 | 90 | 50 | 40 | 30 |
| Rolling resistance (index) | 97 | 99 | 96 | 96 | 96 | 96 | 96 | 97 | 97 |
| Durability (index) | 99 | 100 | 95 | 99 | 99 | 99 | 99 | 99 | 99 |
| Difference in loss tangent | 0.010 | 0.035 | 0.035 | 0.035 | 0.035 | 0.035 | 0.035 | 0.035 | 0.035 |
| Difference in complex elastic modulus (MPa) | 1.0 | 1.4 | 1.4 | 1.4 | 1.4 | 1.4 | 1.4 | 1.4 | 1.4 |

What is claimed is:

1. A heavy duty tire comprising:
a carcass having carcass cords which extends from a tread portion to a bead core in each of a pair of bead portions through a pair of sidewall portions,
a belt layer disposed radially outward of the carcass in the tread portion, and
a sidewall rubber disposed axially outward of the carcass in each of the sidewall portions and extending in the radial direction of the tire, wherein the sidewall rubber includes an axially inner rubber portion disposed axially outward of the carcass and an axially outer rubber portion disposed axially outward of the axially inner rubber portion to form a tire outer surface, the axially inner rubber portion has a lower loss tangent than that of the axially outer rubber portion by a difference of 0.010 to 0.035, and the axially inner rubber portion has a lower complex elastic modulus than that of the axially outer rubber portion by a difference of 0.5 to 1.4 MPa,
wherein in each said bead portion is disposed a bead apex rubber which extends from the bead core toward radially outward of the tire in a tapered manner, and the radially outer end portion of the bead apex rubber is located between the axially inner and outer rubber portions of the sidewall rubber.

2. The heavy duty tire of claim 1,
wherein the tread portion is provided with a tread rubber extending axially outwardly beyond the axially outer ends of the belt layer and radially inwardly in a tapered manner toward its tip ends each located between the radially outer end portions of said axially inner and outer rubber portions of the sidewall rubber.

3. The heavy duty tire of claim 1, wherein at a location M which is the middle of a radial distance X from the axially outer end of the belt layer to the radially outer surface of the bead core, the inner rubber portion of the sidewall rubber has a thickness of 0.3 to 0.5 time a thickness between the carcass cord and the tire outer surface.

4. The heavy duty tire of claim 1, wherein the radially outer end of the inner rubber portion of the sidewall rubber is located in a region between the axially outer end of the belt layer and a location radially outwardly apart from a location M by a distance of 0.25 time a radial distance X from the axially outer end of the belt layer to the radially outer surface of the bead core, in which the location M is the middle of the radial distance X.

5. The heavy duty tire of claim 1, wherein a reinforcing cord layer having an approximately U-shaped cross section is disposed in the bead portion to envelope the bead core, and the radially inner end of the inner rubber portion of the sidewall rubber is located in a region between a radially outermost end of the reinforcing cord layer and a location radially inwardly apart from a location M by a distance of 0.25 time a radial distance X from the axially outer end of the belt layer to the radially outer surface of the bead core, in which the location M is the middle of the radial distance X.

6. The heavy duty tire of claim 1, wherein the inner rubber portion of the sidewall rubber has a loss tangent of 0.030 to 0.075.

7. The heavy duty tire of claim 1, wherein the inner rubber portion of the sidewall rubber has a complex elastic modulus of 2.0 to 3.5 MPa.

* * * * *